(12) United States Patent
Dix et al.

(10) Patent No.: US 8,876,194 B2
(45) Date of Patent: Nov. 4, 2014

(54) VEHICLE FRONT BODY STRUCTURE

(71) Applicant: Nissan North America, Inc., Franklin, TN (US)

(72) Inventors: Jeffery Dix, Commerce Township, MI (US); Ryan Corby, Novi, MI (US); Joyce Lam, Bloomfield Hills, MI (US)

(73) Assignee: Nissan North America, Inc., Franklin, TN (US)

( * ) Notice: Subject to any disclaimer, the term of this patent is extended or adjusted under 35 U.S.C. 154(b) by 21 days.

(21) Appl. No.: 13/850,597

(22) Filed: Mar. 26, 2013

(65) Prior Publication Data

US 2014/0292028 A1 Oct. 2, 2014

(51) Int. Cl.
*B62D 25/04* (2006.01)
*B62D 25/08* (2006.01)
*B62D 21/15* (2006.01)

(52) U.S. Cl.
CPC .............. *B62D 21/152* (2013.01); *B62D 25/08* (2013.01)
USPC .............. 296/187.09; 296/187.1; 296/203.02; 296/193.02; 296/29; 296/198

(58) Field of Classification Search
CPC ......... B62D 25/04; B62D 25/08; B62D 25/16
USPC .............. 296/187.09, 187.1, 193.05, 193.06, 296/193.09, 198, 203.02, 29, 30, 193.02
See application file for complete search history.

(56) References Cited

U.S. PATENT DOCUMENTS

| | | | | |
|---|---|---|---|---|
| 5,316,367 | A * | 5/1994 | Enning et al. ............ | 296/187.09 |
| 7,147,275 | B2 * | 12/2006 | Matsuyama et al. ...... | 296/203.02 |
| 7,762,619 | B2 * | 7/2010 | Baccouche et al. ...... | 296/187.09 |
| 7,887,122 | B2 * | 2/2011 | Baccouche et al. ...... | 296/187.09 |
| 7,887,123 | B2 * | 2/2011 | Honji et al. .............. | 296/187.09 |
| 8,128,160 | B2 * | 3/2012 | Leanza et al. ............ | 296/203.02 |
| 8,240,746 | B2 * | 8/2012 | Yamagishi et al. ........... | 296/192 |
| 8,393,673 | B2 * | 3/2013 | Terada et al. ............ | 296/193.09 |
| 8,596,711 | B2 * | 12/2013 | Yasui et al. .............. | 296/187.09 |
| 8,746,784 | B2 * | 6/2014 | Hanakawa ................ | 296/193.09 |
| 2007/0215402 | A1 * | 9/2007 | Sasaki et al. .................. | 180/232 |
| 2008/0265623 | A1 * | 10/2008 | Kiyotake et al. ......... | 296/187.09 |
| 2009/0146455 | A1 * | 6/2009 | Honji et al. .............. | 296/187.09 |
| 2009/0243336 | A1 * | 10/2009 | Honji et al. .............. | 296/187.09 |

(Continued)

FOREIGN PATENT DOCUMENTS

| | | |
|---|---|---|
| JP | 05-105119 A | 4/1993 |
| JP | 08-133124 A | 5/1996 |

*Primary Examiner* — Gregory Blankenship
(74) *Attorney, Agent, or Firm* — Global IP Counselors, LLP

(57) ABSTRACT

A vehicle front body structure includes a front side member, an A-pillar and a strut tower. The front side member extends in a vehicle longitudinal direction. The A-pillar is coupled to the front side member. The strut tower is positioned forward of the A-pillar and has an inboard side fixedly attached to an outboard section of the front side member. The strut tower also defines a force receiving surface extending between the inboard side and an outboard side. The force receiving surface of the strut tower is configured and arranged to receive a force directed rearward in the vehicle longitudinal direction and redirect at least a portion of the force in a vehicle lateral direction toward the front side member.

20 Claims, 13 Drawing Sheets

(56) References Cited

U.S. PATENT DOCUMENTS

| | | | |
|---|---|---|---|
| 2009/0315365 A1* | 12/2009 | Baccouche et al. | 296/205 |
| 2010/0026047 A1* | 2/2010 | Baccouche et al. | 296/187.09 |
| 2011/0084518 A1* | 4/2011 | Yamagishi et al. | 296/187.09 |
| 2011/0095568 A1* | 4/2011 | Terada et al. | 296/187.09 |
| 2011/0101732 A1* | 5/2011 | Baccouche et al. | 296/187.09 |
| 2012/0205944 A1* | 8/2012 | Kido et al. | 296/187.09 |
| 2012/0248819 A1* | 10/2012 | Okamura et al. | 296/187.1 |
| 2012/0248820 A1* | 10/2012 | Yasui et al. | 296/187.09 |
| 2012/0306234 A1 | 12/2012 | Akaki et al. | |
| 2013/0241233 A1* | 9/2013 | Ohnaka et al. | 296/187.1 |

* cited by examiner

US 8,876,194 B2

VEHICLE FRONT BODY STRUCTURE

BACKGROUND

1. Field of the Invention

The present invention generally relates to a vehicle front body structure. More specifically, the present invention relates to a vehicle front body structure with a strut tower that defines a force receiving surface configured to receive a force directed rearward in a vehicle longitudinal direction and redirect at least a portion of that force into lateral movement of the vehicle.

2. Background Information

Vehicle body structures are regularly being redesigned to include structural features that absorb impact forces in response to impact events. Recently introduced impact event tests include a frontal offset test where a vehicle is provided with velocity in a vehicle longitudinal direction (forward momentum) such that a front corner of the vehicle (approximately 25 percent of the overall width of the vehicle) impacts a fixed, rigid barrier B. FIGS. 1 and 2 schematically show an example of a conventional vehicle C undergoing an impact event with the fixed barrier B in accordance with the small overlap test.

FIG. 1 shows the conventional vehicle C approaching the rigid barrier B in the small overlap test. FIG. 2 shows the conventional vehicle C just after impact with the rigid barrier B showing initial deformation and forward momentum being transformed into displacement of the vehicle C.

SUMMARY

One object of the invention is to employ a surface of a strut tower of a vehicle as a ramping surface to redirect at least a portion of forward momentum of a vehicle into lateral movement of the vehicle.

In view of the state of the known technology, one aspect of the present disclosure is to provide a vehicle front body structure with a front side member, an A-pillar and a strut tower. The front side member extends in a vehicle longitudinal direction. The A-pillar is coupled to the front side member. The strut tower is positioned forward of the A-pillar and has an inboard side fixedly attached to an outboard section of the front side member. The strut tower also defines a force receiving surface extending between the inboard side and an outboard side. The force receiving surface of the strut tower is configured and arranged to receive a force directed rearward in the vehicle longitudinal direction, and redirect at least a portion of the force in a vehicle lateral direction toward the front side member.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 13:
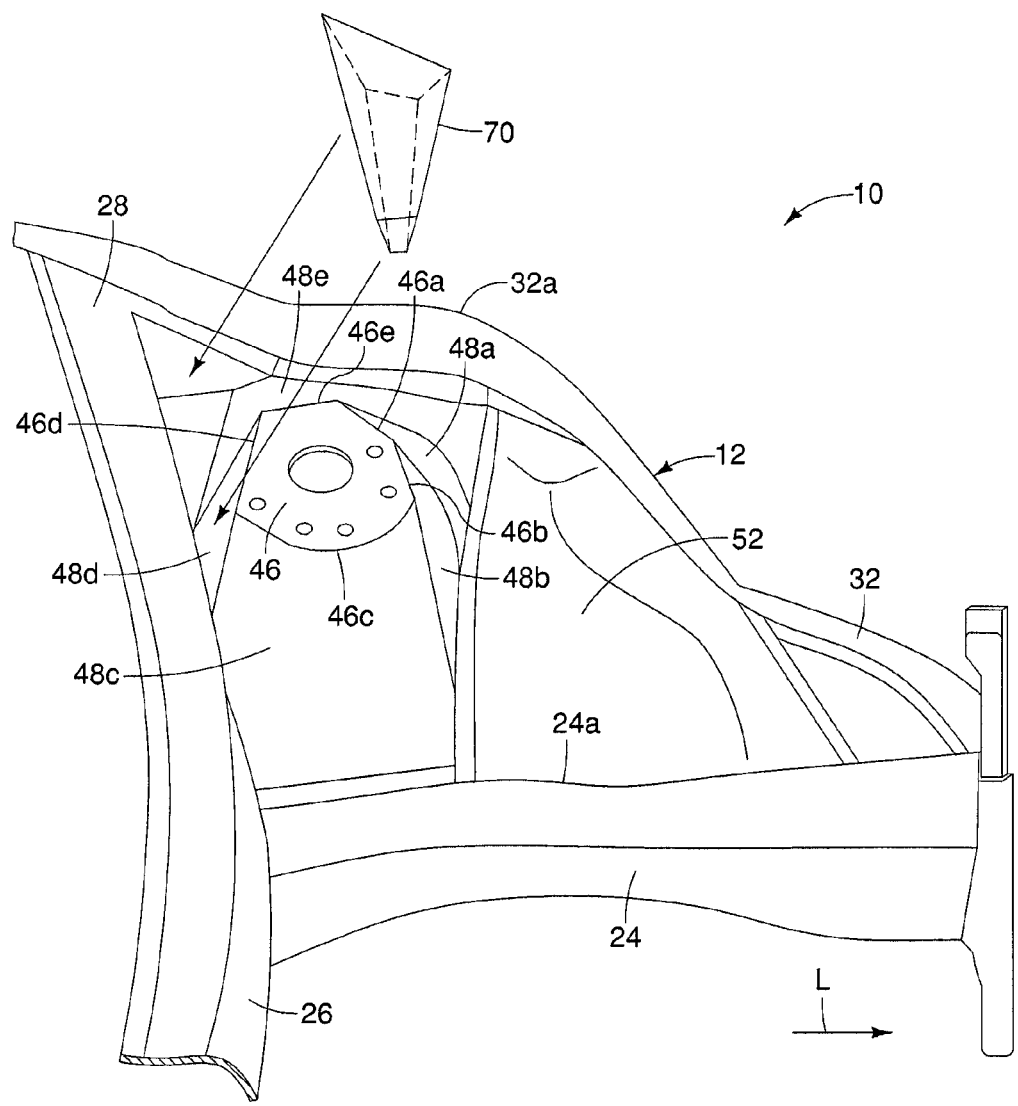
FIG. 13 is an exploded perspective view of a portion of the front structure of the vehicle showing the strut tower, the dash wall, the front side member and a reinforcement member as seen from within the engine compartment with the engine assembly removed in accordance with a first embodiment.
Figure 14:
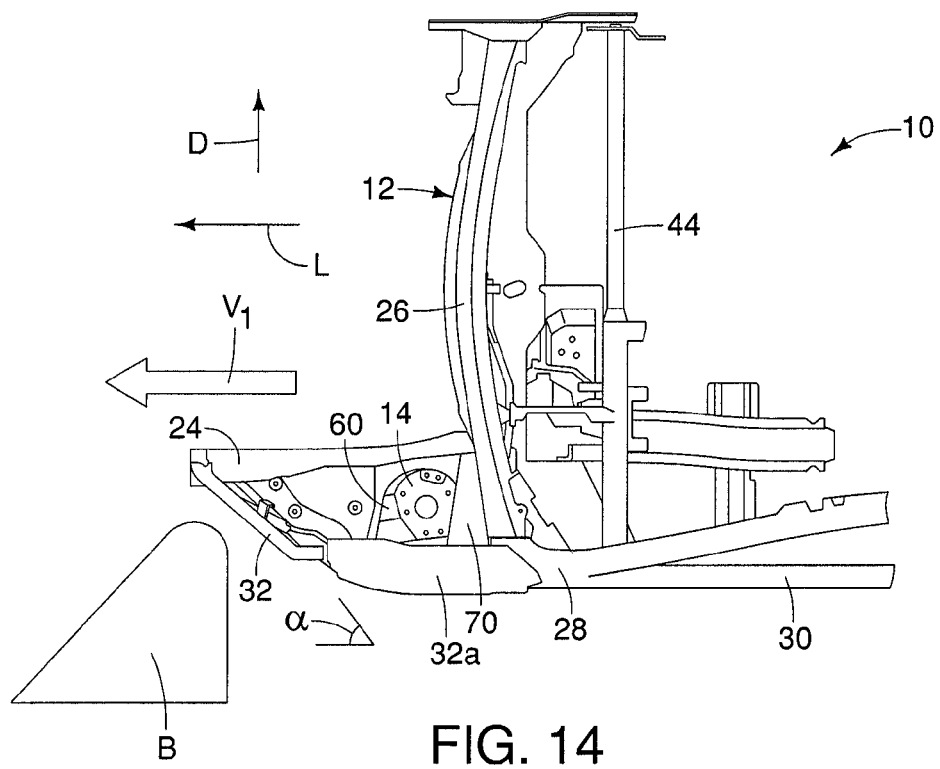
FIG. 14 is a schematic top view of a portion of the front structure of the vehicle including the reinforcement located between the A-pillar, the dash wall and the strut tower, and showing a force receiving surface of the strut tower in relation to a rigid barrier just prior to an impact event in a small overlap test in accordance with the first embodiment.
Figure 15:
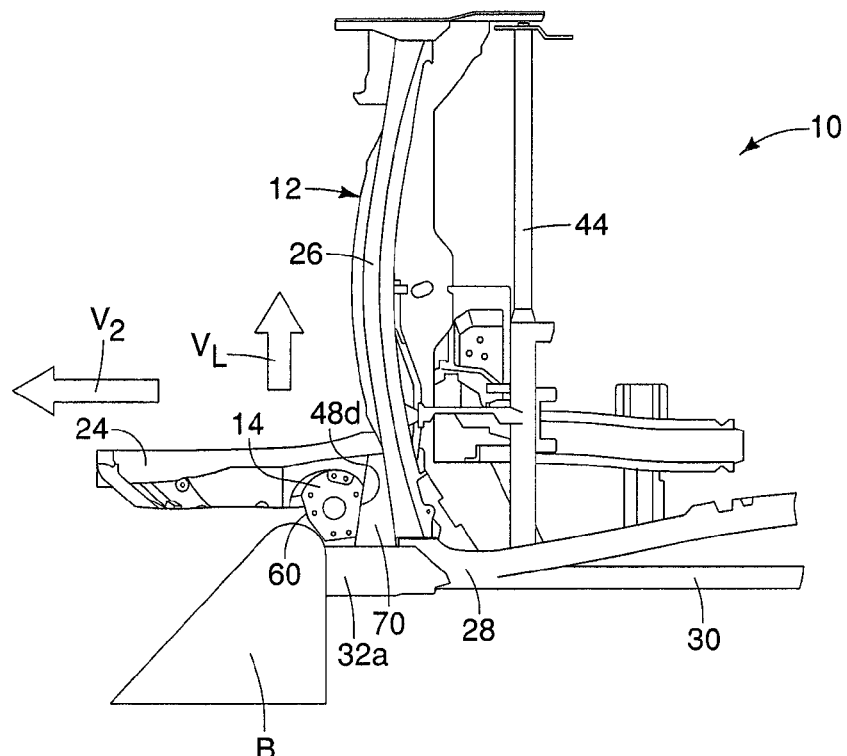
FIG. 15 is another schematic top view of the portion of the front structure of the vehicle similar to FIG. 14, showing the force receiving surface of the strut tower during the impact event in contact with the rigid barrier during the small overlap test with the front structure (and the vehicle) undergoing lateral movement in accordance with the first embodiment.

Referring initially to FIG. 3-12, a vehicle 10 is illustrated in accordance with various embodiments, and a first embodiment is described with specific reference to FIGS. 13-15. The vehicle 10 is provided with a front body structure 12 that includes a strut tower 14 with a ramping surface (described below) configured to redirect impact force from a vehicle longitudinal direction L (FIGS. 8 and 9) to a vehicle lateral direction D (FIG. 9), in response to an impact event such that the vehicle 10 moves in a vehicle lateral direction D during the impact event.

Figure 1:
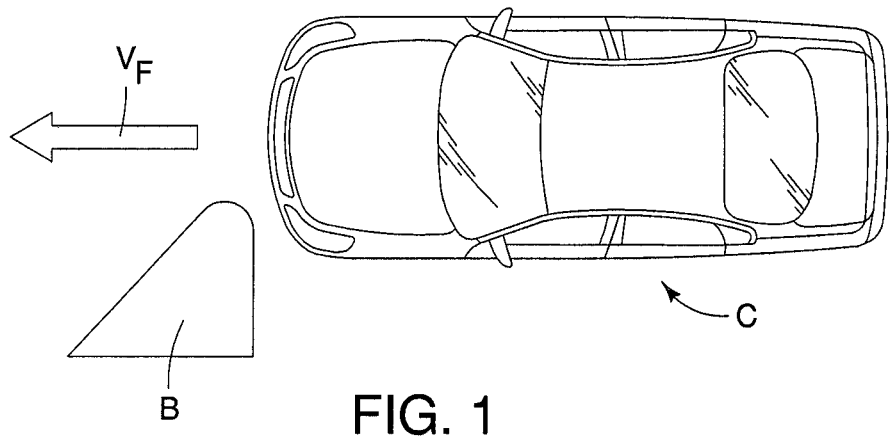
FIG. 1 is a schematic view of a conventional moving vehicle moving toward a rigid barrier in a small overlap test where a front corner of the vehicle is aligned with a fixed, rigid barrier for eventual impact with the rigid barrier.
Figure 2:
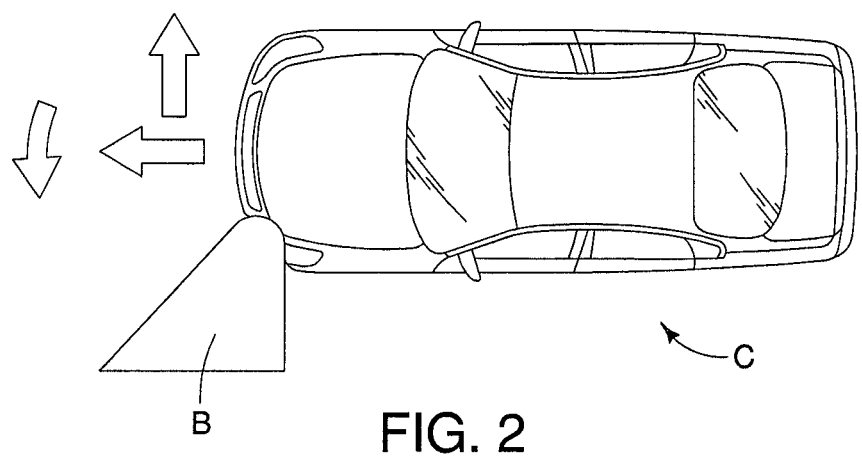
FIG. 2 is another schematic view of the conventional vehicle showing its response to the small overlap test at the beginning of an impact event with the front corner of the conventional vehicle impacting the barrier and beginning to undergo deformation.

The Insurance Institute for Highway Safety (IIHS) has developed various tests where vehicles are provided with forward velocity and impacted against fixed, rigid barriers, like the rigid barrier B depicted in FIGS. 1 and 2. In the IIHS tests, the conventional vehicle C is aimed at the rigid barrier B such that approximately 25 percent of the front of the conventional vehicle C impacts the rigid barrier B. In other words, as indicated in FIGS. 1 and 2, only a front corner of the conventional vehicle C impacts the rigid barrier B. This IIHS test is known as a frontal offset, narrow offset, or small overlap test. In such tests, a front bumper assembly of the conventional vehicle C is either not impacted, or undergoes only limited contact with the rigid barrier B during the impact event. Therefore, other structures at a front portion of the conventional vehicle C are likely to come into contact with the rigid barrier B and absorb the impacting force that results from the impact event.

The small overlap test is represented schematically in FIGS. 1 and 2. During the impact event, a variety of structures can undergo deformation. This deformation is not explicitly depicted in FIG. 2 with any degree of accuracy because such deformation varies from conventional vehicle to conventional vehicle, depending upon the overall design of the front structure of the conventional vehicle C. Instead, in FIG. 2, the conventional vehicle C is depicted with a generic degree of deformation as a result of the impact event.

The forward momentum or velocity $V_F$ acting on the conventional vehicle C as it moves is transformed upon impact with the rigid barrier B. The velocity $V_F$ corresponds to kinetic energy such that upon impact, the kinetic energy associated with the velocity $V_F$ results in an equal and opposite reaction force acting on the vehicle C as the vehicle C undergoes rapid deceleration. For example, a portion of that reaction force can be transmitted during the impact event to the dash wall and/or the A-pillar of the conventional vehicle C.

It should be understood from the drawings and the description hereinbelow, that in conventional vehicle structures, such as a front bumper assembly, the conventional vehicle structures are configured to absorb impact energy, in particular during an impact event where the point of impact is centered or near the center of the front bumper assembly. In the vehicle 10 described below in the various embodiments, a front bumper assembly is included that absorbs impact energy during impact events. However, in the various embodiments described below, the strut tower 14 and surrounding structures are not designed to purely absorb the impact forces during a small overlap test, but rather are configured to define a ramping surface or ramping surfaces that pushes back or deflects the kinetic energy (the impacting forces) with an opposing force against the rigid barrier B. The ramping surface described below, defines an angled surface that deflects the rigid barrier thereby redirecting at least a portion of the impacting force during the impact event, into lateral movement of the vehicle 10 during the small overlap test (e.g., as opposed to simply a rotational moment force about the barrier B). In other words, velocity of the vehicle 10 is transformed or redirected by the ramping surface into lateral velocity, moving the vehicle 10 in a lateral direction away from the rigid barrier B during the small overlap test.

It should be understood from the drawings and the description herein that during an impact event, such as the small overlap test, the reaction forces experienced by the vehicle 10 as it impacts the rigid barrier B can be significant. The kinetic energy associated with the velocity of the vehicle 10 is exponentially greater than the forces the structures of the vehicle 10 undergo during normal operating usage of the vehicle 10. In other words, the small overlap test and corresponding impact events referred to herein are intended as destructive tests. Further, the impact events of the small overlap tests are such that impact between the vehicle 10 and the rigid barrier B occurs at the strut tower 14 of the vehicle 10, outboard of an engine assembly of the vehicle, as is described in greater detail below.

Figure 3:
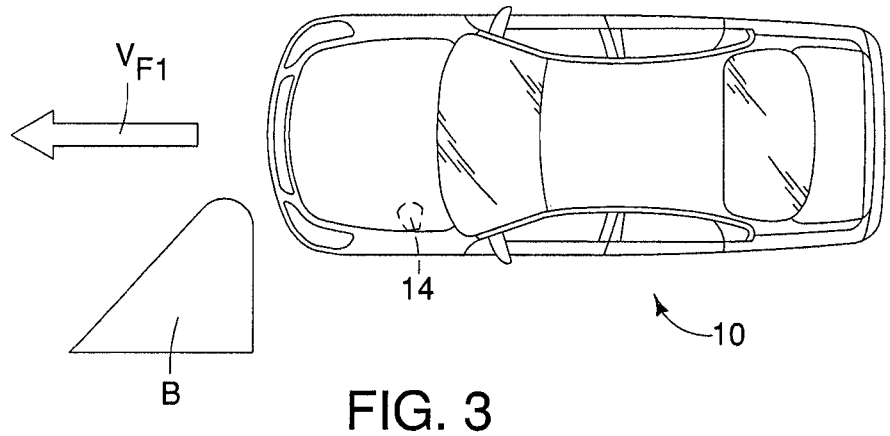
FIG. 3 is a schematic view of a moving vehicle being subjected to a small overlap test where approximately 25 percent of the front of the vehicle is aligned with a fixed, rigid barrier for eventual impact with the barrier in accordance with various embodiments.
Figure 4:
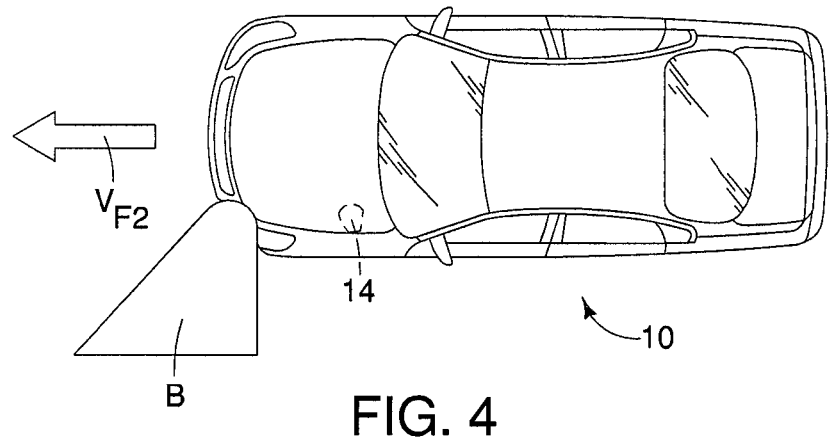
FIG. 4 is another schematic view of the vehicle depicted in FIG. 3 showing an initial response to the impact event of the small overlap test with a front corner of the vehicle impacting the barrier and beginning to undergo deformation in accordance with the various embodiments.
Figure 5:
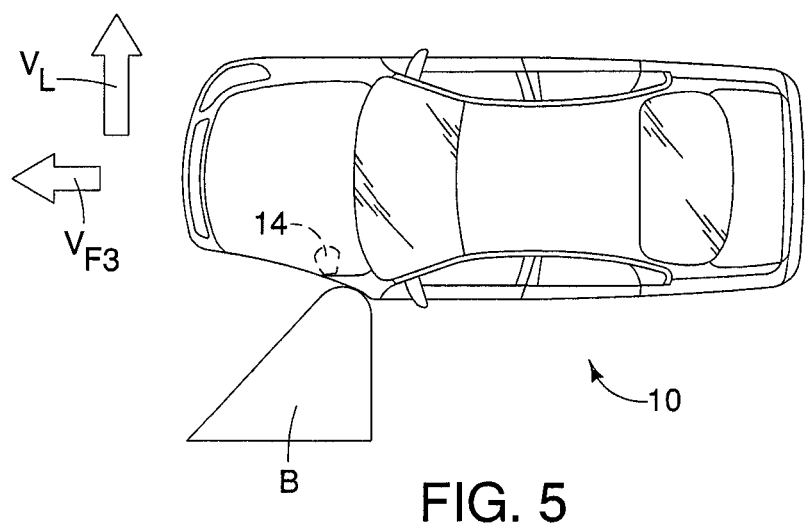
FIG. 5 is still another schematic view of the vehicle depicted in FIGS. 3 and 4 showing a subsequent response to the impact event of the small overlap test with the moving vehicle undergoing further deformation during the impact event and the vehicle undergoing lateral movement away from the rigid barrier in accordance with the various embodiments.

FIGS. 3-5 show the vehicle 10 (with the strut tower 14 in phantom) in three stages of a small overlap test. In FIG. 3, the vehicle 10 is provided with forward velocity $V_{F1}$. The small overlap test is designed such that as the vehicle 10 makes contact with the rigid barrier B, as shown in FIG. 4, the rigid barrier B contacts the vehicle 10 at a location that is approximately aligned with the strut tower 14. As is also shown in FIG. 4, the vehicle 10 begins to undergo some deformation at early stages of the impact event, where some of the kinetic energy associated with the velocity $V_{F1}$ has been absorbed by the vehicle 10 and velocity (and kinetic energy) is slightly diminished to the velocity $V_{F2}$. As shown in FIG. 5, once the rigid barrier B comes into contact with the strut tower 14, the ramping surface of the strut tower 14 deflects the rigid barrier B. In other words, at least a portion of the kinetic energy associated with the velocity $V_{F2}$ is redirected into a lateral force component or lateral velocity $V_L$. Put another way, the ramping surface of the strut tower 14 exerts a reaction force against the rigid barrier B causing the vehicle 10 to move laterally away from the rigid barrier B, as is described in greater detail below.

Figure 6:
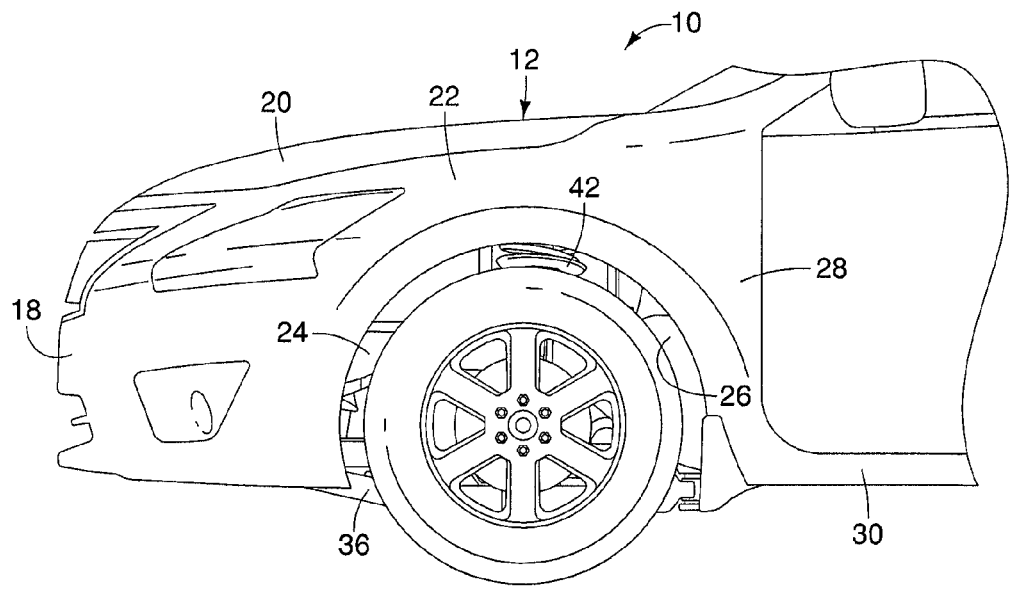
FIG. 6 is side view of a front end of the vehicle showing portions of a front structure in accordance with the various embodiments.
Figure 7:
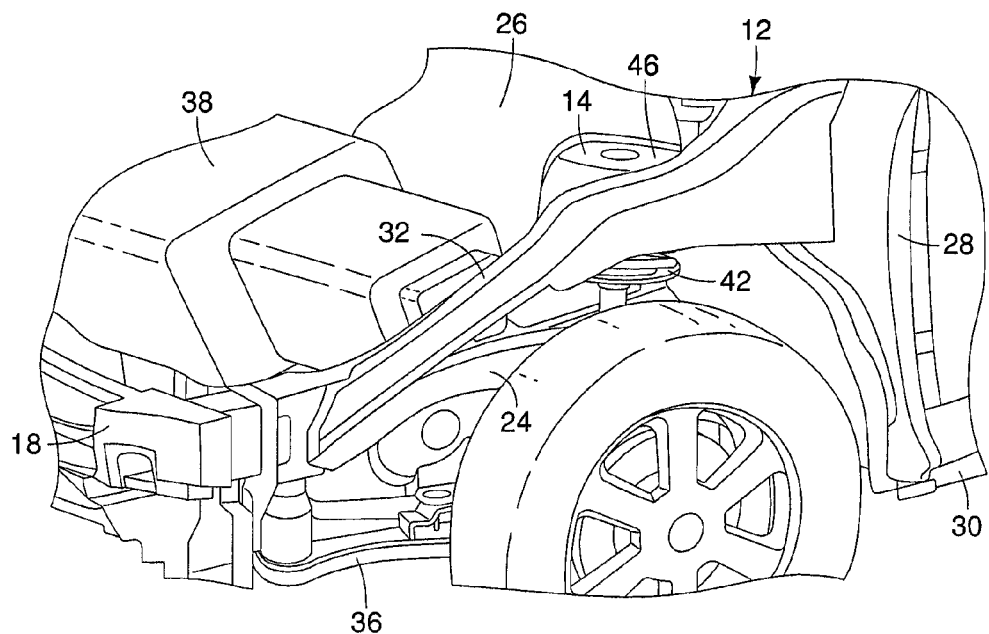
FIG. 7 is a perspective view of portions of the front structure of the vehicle depicted in FIG. 6, with fenders and a hood removed revealing an engine cradle, a strut, a strut tower, an A-pillar, a portion of a dash wall, a front side member and a hood ledge in accordance with the various embodiments.
Figure 8:
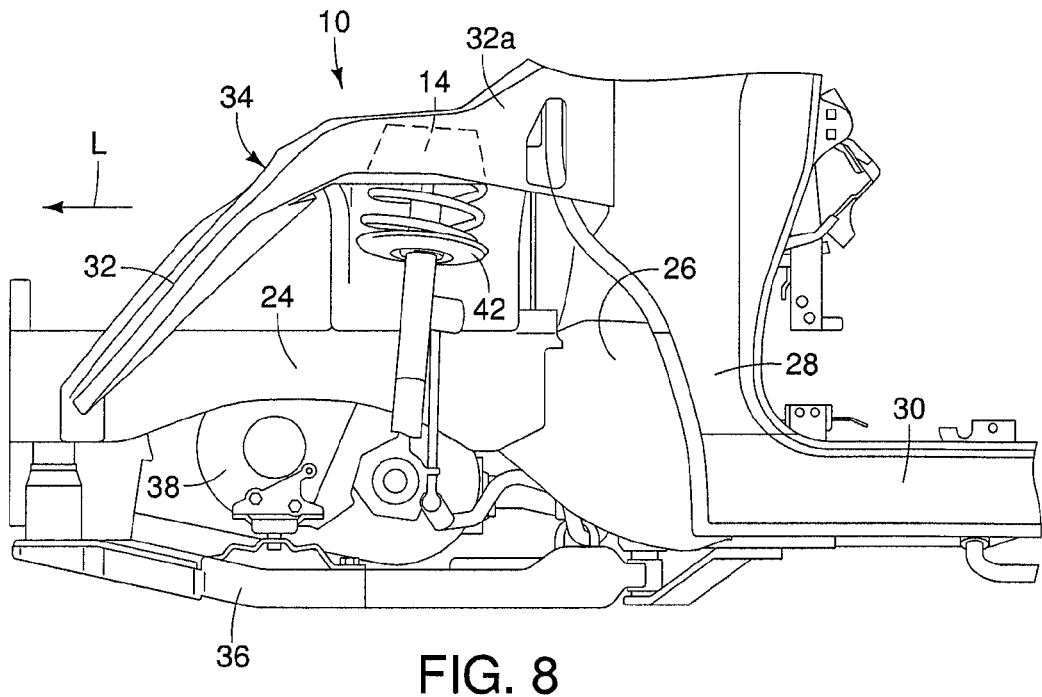
FIG. 8 is a side view of the front structure of the vehicle showing the engine cradle, the strut, portions of the strut tower (in phantom), the A-pillar, the portion of the dash wall, the front side member and the hood ledge in accordance with the various embodiments.

A brief description of the vehicle 10 is now provided with initial reference to FIG. 6. The vehicle 10 includes a variety of elements, such as a front bumper assembly 18, a hood 20, fenders 22, a front side member 24, a dash wall 26, an A-pillar 28 and a sill 30. In FIGS. 7 and 8, the front bumper assembly 18, the hood 20 and the fenders 22 are removed to reveal details of the front body structure 12. Specifically, the front body structure 12 includes the front side member 24, the dash wall 26, the A-pillar 28, the sill 30, a hood ledge 32 and the strut tower 14. Also revealed in FIGS. 7 and 8 is an engine cradle 36 and an engine assembly 38.

The front side member 24 is a beam-like construct that extends from the front of the vehicle 10 behind the front bumper assembly 18, and rearward to the dash wall 26 and further rearward under a floor of the passenger compartment of the vehicle 10. There are two front side members 24, one on each side of the vehicle 10. The front side members 24 are approximately the same, but symmetrically shaped with respect to one another (mirror images of one another). Therefore, description of one front side member 24 applies to both.

The front side member 24 extends in a vehicle longitudinal direction L of the vehicle 10 and supports the engine cradle 36 and the engine assembly 38. More specifically, the engine assembly 38 is mounted in a conventional manner to the engine cradle 36, and the engine cradle 36 is fixedly attached to an underside of the front side member 24 in a conventional manner.

The dash wall 26 includes a series of panels rigidly fixed to one another defining a wall that separates the engine compartment and the passenger compartment of the vehicle 10. The dash wall 26 extends from one side of the vehicle 12 to the other side of the vehicle 10 in a conventional manner.

Figure 9:
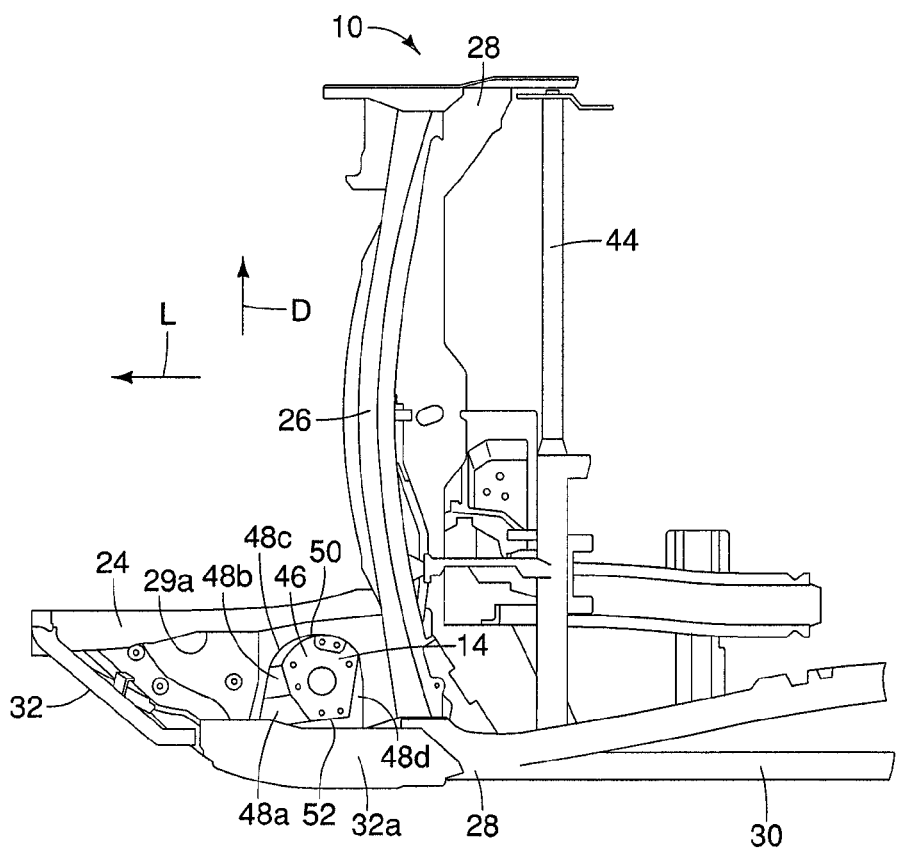
FIG. 9 is a top view of the front structure of the vehicle showing the strut tower, the A-pillar, the dash wall, the front side member, the hood ledge and a cross-member in accordance with the various embodiments.
Figure 10:
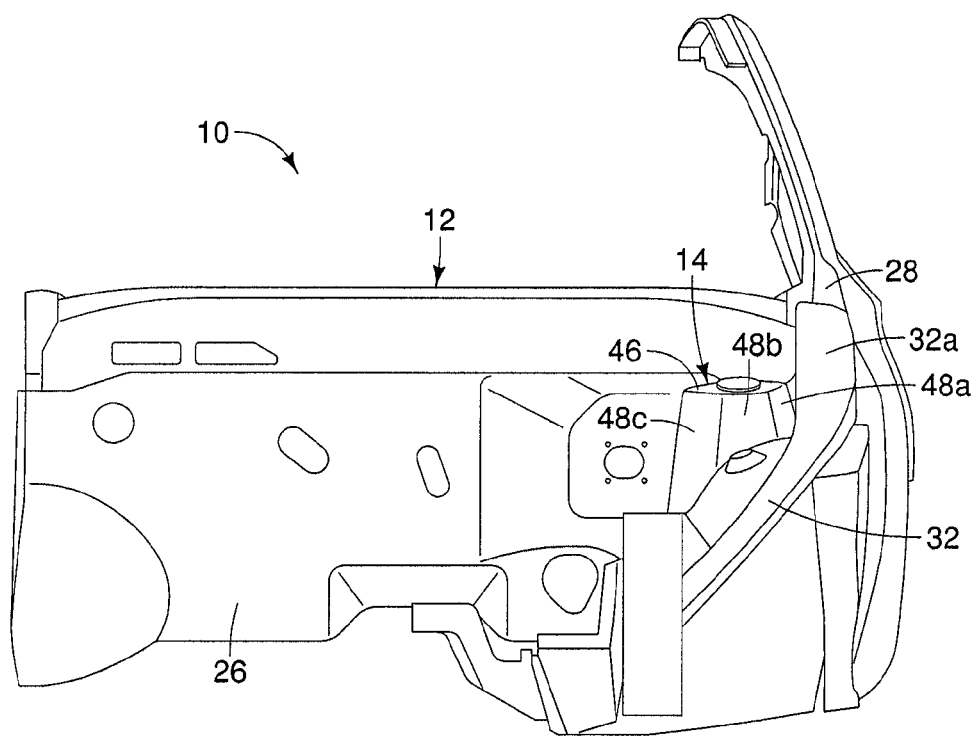
FIG. 10 is a front view of the front structure of the vehicle with various mechanical elements, such as the engine, removed to reveal details of the dash wall, the front side member, the hood ledge and the strut tower in accordance with the various embodiments.
Figure 11:
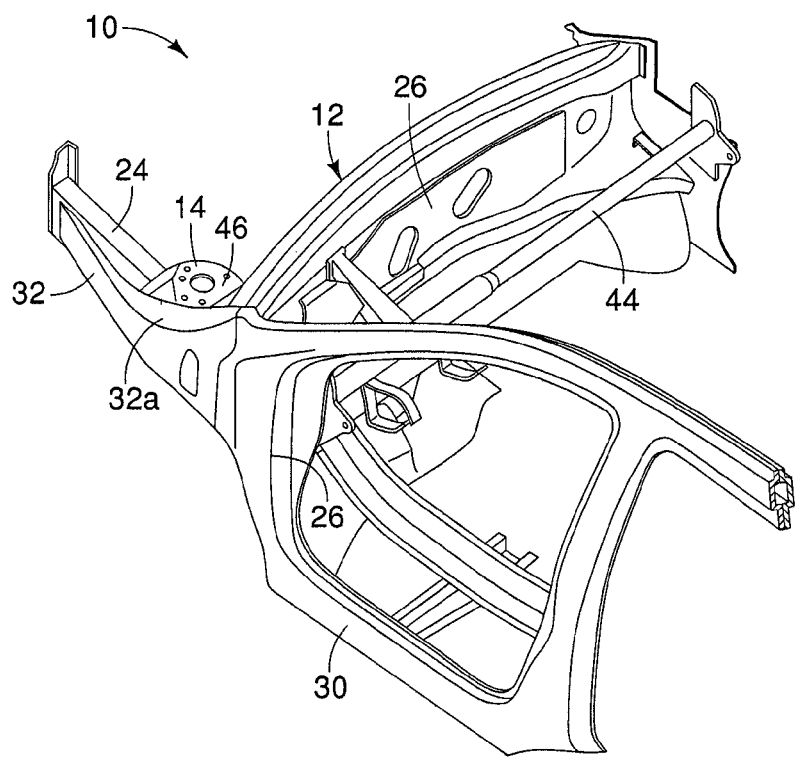
FIG. 11 is another perspective view of the front structure of the vehicle showing the strut tower, the A-pillar, the dash wall, the front side member and a cross-member in accordance with the various embodiments.
Figure 12:
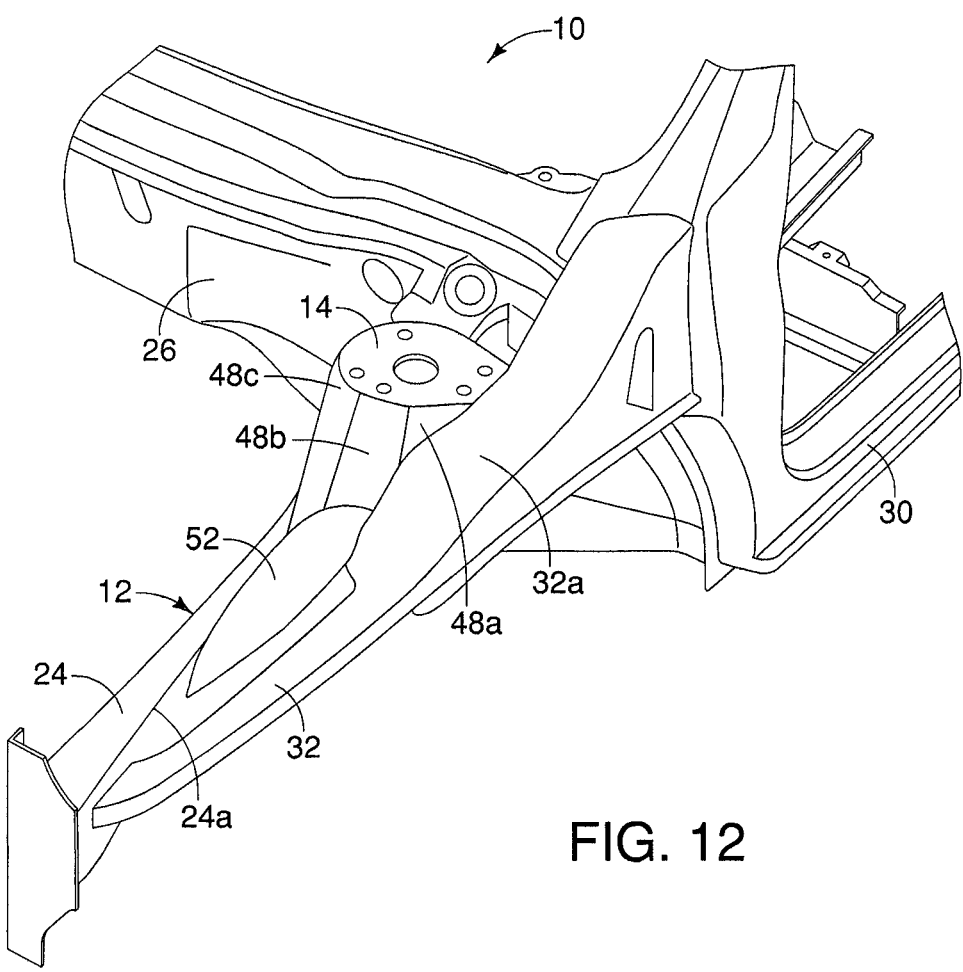
FIG. 12 is another perspective view of the front structure of the vehicle showing the strut tower, the A-pillar, the dash wall and the front side member in accordance with the various embodiments.

There are two A-pillars 28, one on either lateral side of the vehicle 10, but like the front side member 24, the A-pillars 28 are the same, symmetrically shaped with respect to one another (mirror images of one another). Therefore, description of one applies to both. The A-pillar 28 is rigidly fixed to one lateral end of the dash wall 26. The sill 30 is rigidly attached to a lower end of the A-pillar 28 and extends rearward beneath a door opening in a conventional manner. Since the front side member 24 is rigidly fixed to the dash wall 26 in a conventional manner (e.g., by welding) and the dash wall 26 is rigidly fixed to the A-pillar 28 (e.g., by welding) the front side member 24 and the A-pillar 28 are rigidly coupled to one another. Further a cross-member 44 extends laterally between and is rigidly fixed to each of the A-pillars 28, as shown in FIG. 9. The cross-member 44 is a structural element of the front body structure 12 that is typically hidden between the dash wall 26 and an instrument panel within the passenger compartment of the vehicle 10. As well, there are other structural elements of the vehicle 10, such as cross-members beneath the floor of the passenger compartment that rigidly couple the A-pillar 28 to the front side member 24 in a conventional manner.

The hood ledge 32 extends from a front end of the front side member 24, curves upward, laterally outward and rearward. The hood ledge 32 also includes a rear section 32a that extends to the A-pillar 28 in a conventional manner. The hood ledge 32 is welded to the front end of the front side member 24 and the rear section 32a of the hood ledge is welded to one or both of the A-pillar 28 and the dash wall 26.

As shown in FIGS. 8-12, the strut tower 14 is a rigid structure that supports an upper end of a strut 42 of the suspension assembly of the vehicle 10, as shown in FIG. 8. A lower end of the strut 42 is attached to a steering knuckle of the suspension assembly of the vehicle 10. Since struts, such as the strut 42, steering mechanisms and suspension assemblies are conventional features of a vehicle, further description is omitted for the sake of brevity. However, it should be understood from the drawings and the description herein that the strut 42 is supported at an upper end by the strut tower 14 and is supported at its lower end by the steering mechanism and suspension assembly of the vehicle 10.

The strut tower 14 is positioned forward of the A-pillar 28 and the dash wall 26, as shown in FIGS. 8-9 and 11-12. The strut tower 14 is further positioned outboard relative to the front side member 24, as shown in FIG. 9.

A first embodiment of the strut tower 14 is now described with specific reference to FIGS. 13-15. As shown in FIG. 13, the strut tower 14 basically includes a top plate 46 and wall sections 48a, 48b, 48c, 48d and 48e. The top plate 46 and the wall sections 48a-48e approximate a frustoconical-like shape configured to receive and support the strut 42. The top plate 46 is made of a thick metallic plate material with apertures for attachment to the strut 42. The top plate 46 includes a peripheral edge that includes a first section 46a, a second section 46b, a third section 46c, a fourth section 46c and a fifth section 46e. In the depicted embodiments, the first section 46a, the second section 46b, the fourth section 46c and the fifth section 46e of the peripheral edge of the top plate 46 have a generally straight contour. However, the third section 46c (an inboard section) of the peripheral edge of the top plate 46 has a generally curved contour.

The top plate 46 in the depicted embodiments has a thickness exceeding that of a conventional strut tower in order to support the ramping surface effects of the strut tower 14, as is further described hereinbelow.

The wall sections 48a-48e can be made from a single shaped metallic plate material or can be made of a plurality of metal plates that are shaped and then welded together to form the vertical portions of the overall frustoconical shape of the strut tower 14. The top plate 46 can similarly be stamped out along with the wall sections 48a-48e from a single metallic plate member or can be a separate plate element, cut to form the overall contour of the top plate 46 and subsequently welded to the wall sections 48a-48e.

The wall section 48a faces the front of the vehicle 10 and extends from the first section 46a of the peripheral edge of the top plate 46 of the strut tower 14 downward to an inner fender shield 52 and toward the front side member 24. Similarly, the wall section 48b faces the front of the vehicle 10 and extends from the second section 46b of the peripheral edge of the top plate 46 of the strut tower 14 downward to the inner fender shield 52 and toward the front side member 24. The wall sections 48a and 48b are further welded or otherwise rigidly fixed to the inner fender shield 52 and can further extend down (not shown) to and be welded to an inboard side 24a of the front side member 24. The inner fender shield 52 extends from the hood ledge 32 to the front side member 24 and is welded in position to the hood ledge 32 and the front side member 24.

The first and second sections 46a and 46b of the peripheral edge of the top plate 46, together with the wall sections 48a and 48b of the strut tower 14 define a ramping surface or force receiving surface 60 of the strut tower 14, as is described in greater detail below.

The force receiving surface 60 is defined in the first embodiment by the first and second sections 46a and 46b of the outer peripheral edge of the top plate 46 and the wall sections 48a and 48b of the strut tower 14. However, it should be understood from the drawings and the description herein that the force receiving surface 60 can be defined by only the first section 46a and the wall section 48a, or can be defined by the second section 46b and the wall section 48b. Still further, the first and second sections 46a and 46b of the peripheral edge of the top plate of the strut tower 14 can be aligned such that the wall sections 48a and 48b are co-planar. Hence, the force receiving surface 60 can be defined in any of a variety of differing ways, as in the various embodiments described below.

The wall section 48c has an upper end that includes a curved contour corresponding to the third section 46c of the peripheral edge of the top plate 46. The wall section 48c extends from the third section 46c (an inboard edge) of the peripheral edge of the top plate 46 down to the inboard side 24a of the front side member 24. At its lower end, the wall section 48c has a straight contour and is welded or otherwise rigidly fixed to the outboard side 24a of the front side member 24.

The wall section 48d extends downward from the fourth section 48d of the peripheral edge of the top plate 46 of the strut tower 14 to the dash wall 26. The wall section 48d is welded or otherwise attached to the dash wall 26. The wall section 48e extends downward from the fifth section 48e of the peripheral edge of the top plate 46 of the strut tower 14 and is welded or otherwise attached to the rear section 32a of the hood ledge 32.

The fifth section 46e of the peripheral edge of the top plate 46 and the wall section 48e define an outboard side of the strut tower 14. The third section 46c of the peripheral edge of the top plate 46 and the wall section 48c define an inboard side of the strut tower 14. Consequently, the inboard side of the strut tower 14 is fixedly attached to the outboard section 24a of the front side member 24 and the outboard side of the strut tower 14 is fixedly attached to the hood ledge 32. Further, the force receiving surface 60 extends between the inboard side and the outboard side of the strut tower 14. The force receiving surface 60 of the strut tower 14 is a ramping surface that is configured and arranged to receive a force directed rearward in the vehicle longitudinal direction L, and redirect at least a portion of the force in the vehicle lateral direction D toward the front side member. In other words, the force receiving surface 60 is configured to deflect the rigid barrier B during the small overlap test causing the vehicle 10 to move laterally away from the rigid barrier B.

As shown in FIGS. 14 and 15, the force receiving surface 60 extends rearwardly and laterally outboard away from the front side member 24 at an inclined angle α with respect to the vehicle longitudinal direction L.

As mentioned above, the force receiving surface 60 (the first and second sections 46a and 46b, and the wall sections 48a and 48b) faces toward the front of the vehicle 10. The force receiving surface 60 is inclined by the angle α relative to the vehicle longitudinal direction L, as shown in FIG. 14. The angle α can be within a range 30 degrees to 70 degrees as indicated. In the first embodiment, at least a portion of the force receiving surface 60 is inclined with the inclined angle being less than 60 degrees.

In the first embodiment, as shown in FIGS. 13-15, the A-pillar 28 and dash wall 26 are spaced apart from the strut tower 14. In the first embodiment, the front body structure 12 includes a reinforcement member 70 that is inserted into the space between the A-pillar 28, the dash wall 26 and the strut tower 14. The reinforcement member 70 has a trapezoidal shape corresponding to the shape of the space between the A-pillar 28, the dash wall 26 and the strut tower 14. The reinforcement member 70 is preferably made of a plurality of metal plates welded to one another to form the depicted shape and further welded in position to each of the A-pillar 28, the dash wall 26 and the strut tower 14.

The reinforcement member 70 is fixedly attached to the adjacent surface of the dash wall 26, the A-pillar 28 and the wall section 48d of the strut tower 14, by, for example, welding. The reinforcement member 70 serves to stiffen and add rigidity to the overall structure of the strut tower 14. Consequently, during an impact event such as the small overlap test, a portion of force applied to the strut tower 14 by the rigid barrier B is transmitted through the reinforcement member 70 to the dash wall 26 and A-pillar 28.

As well, the force receiving surface 60 defines a ramping surface that deflects at least a portion of the kinetic energy associated with the velocity $V_1$ of the vehicle 10 as the strut tower 14 and the rigid barrier B contact one another. The velocity $V_1$ (FIG. 14) is directed in the vehicle longitudinal direction L. As shown in FIG. 15, as the rigid barrier B is deflected along the force receiving surface 60, the kinetic energy associated with the velocity $V_1$ of the vehicle 10 is redirected into lateral velocity $V_L$ in the vehicle lateral direction D. Consequently, a portion of the velocity $V_1$ (FIG. 14) is reduced to a velocity $V_2$ in FIG. 15 and a portion of the kinetic energy of the vehicle 10 is redirected into the lateral component of force or velocity $V_L$, moving the vehicle 10 laterally away from the rigid barrier B.

Hence, the force receiving surface 60 deflects the rigid barrier B during the small overlap test and is reinforced by the reinforcement member 70.

Second Embodiment

Figure 16:
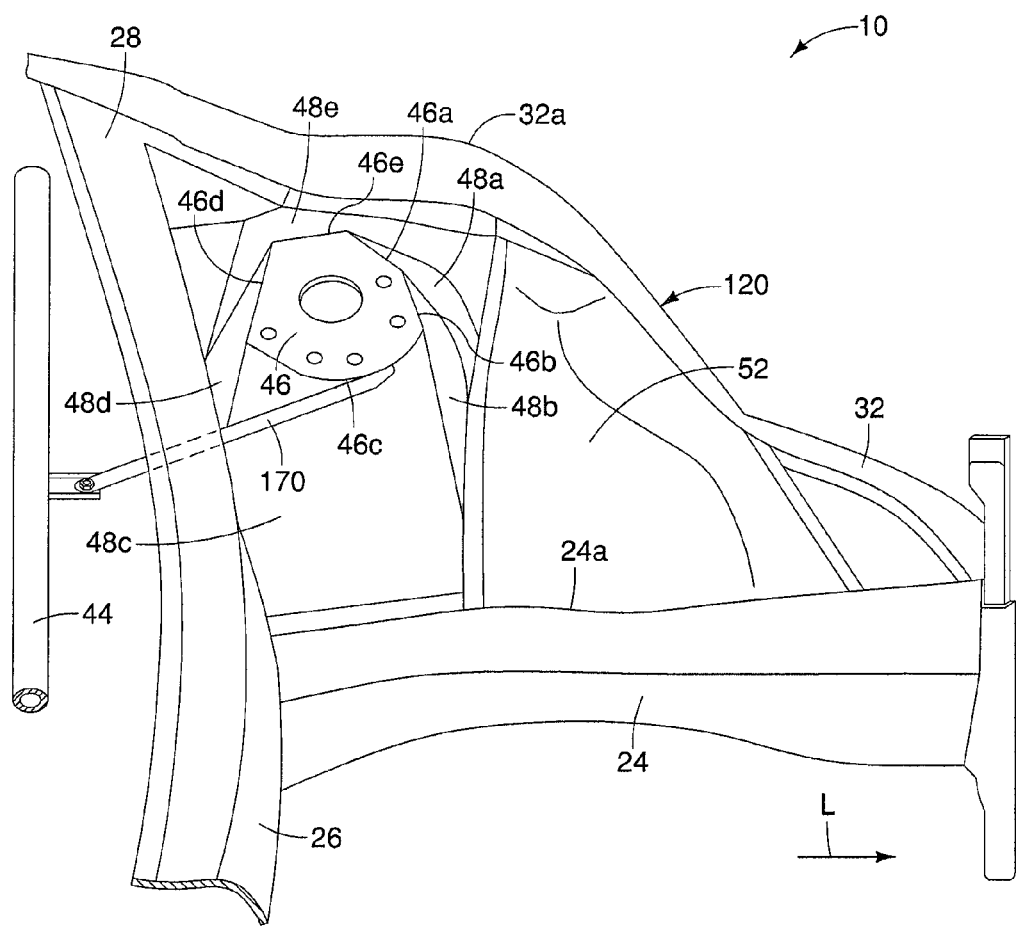
FIG. 16 is a perspective view of a portion of the front structure of the vehicle showing the strut tower, the dash wall, the cross-member, the front side member and a reinforcement member that extends from the strut tower to the cross-member, as seen from within the engine compartment with the engine assembly removed in accordance with a second embodiment.
Figure 17:
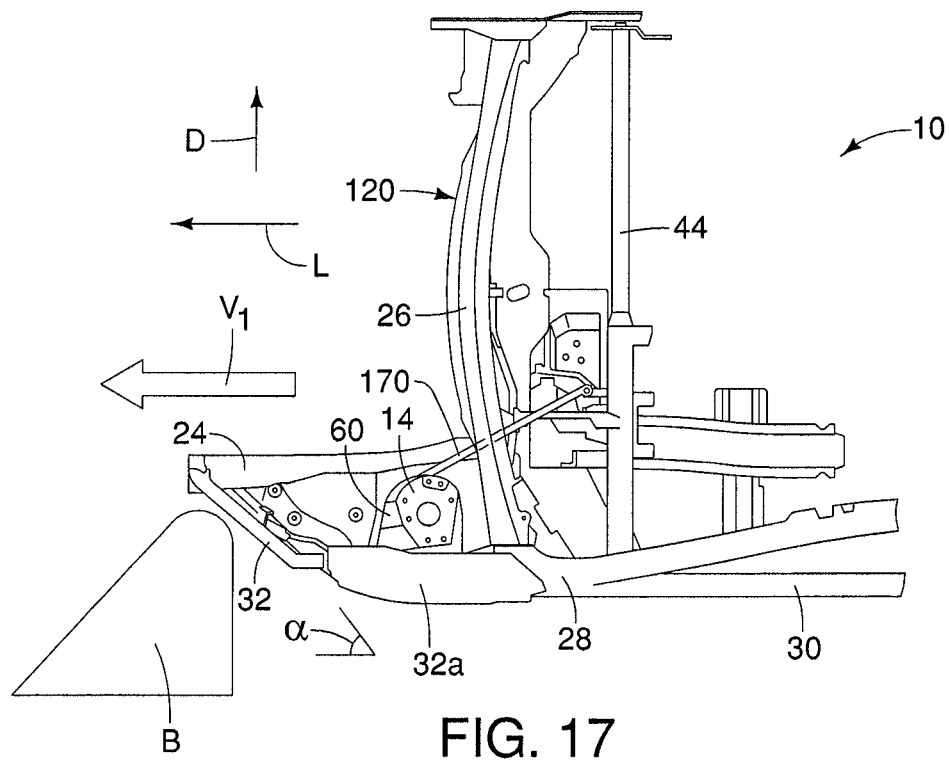
FIG. 17 is a schematic top view of the portion of the front structure of the vehicle showing the reinforcement member extending between an inboard section of the strut tower to the cross-member, and showing a force receiving surface of the strut tower in relation to a rigid barrier just prior to an impact event in a small overlap test in accordance with the second embodiment.
Figure 18:
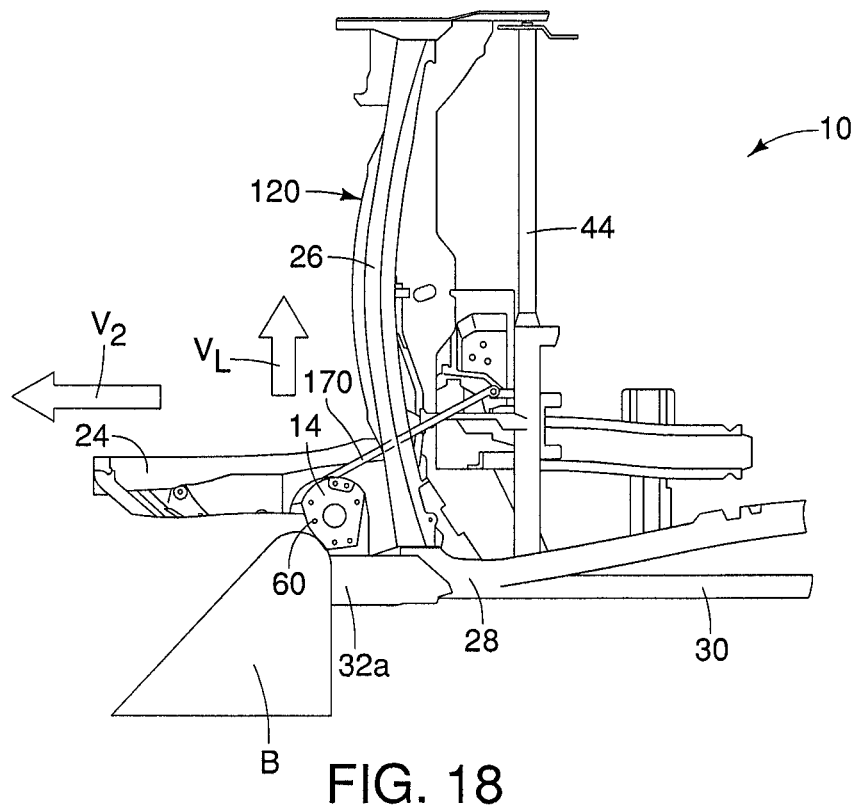
FIG. 18 is another schematic top view of the portion of the front structure of the vehicle similar to FIG. 17, showing the force receiving surface of the strut tower during the impact event in contact with the rigid barrier during the small overlap test, with the front structure (and the vehicle) undergoing lateral movement in accordance with the second embodiment.
Figure 19:
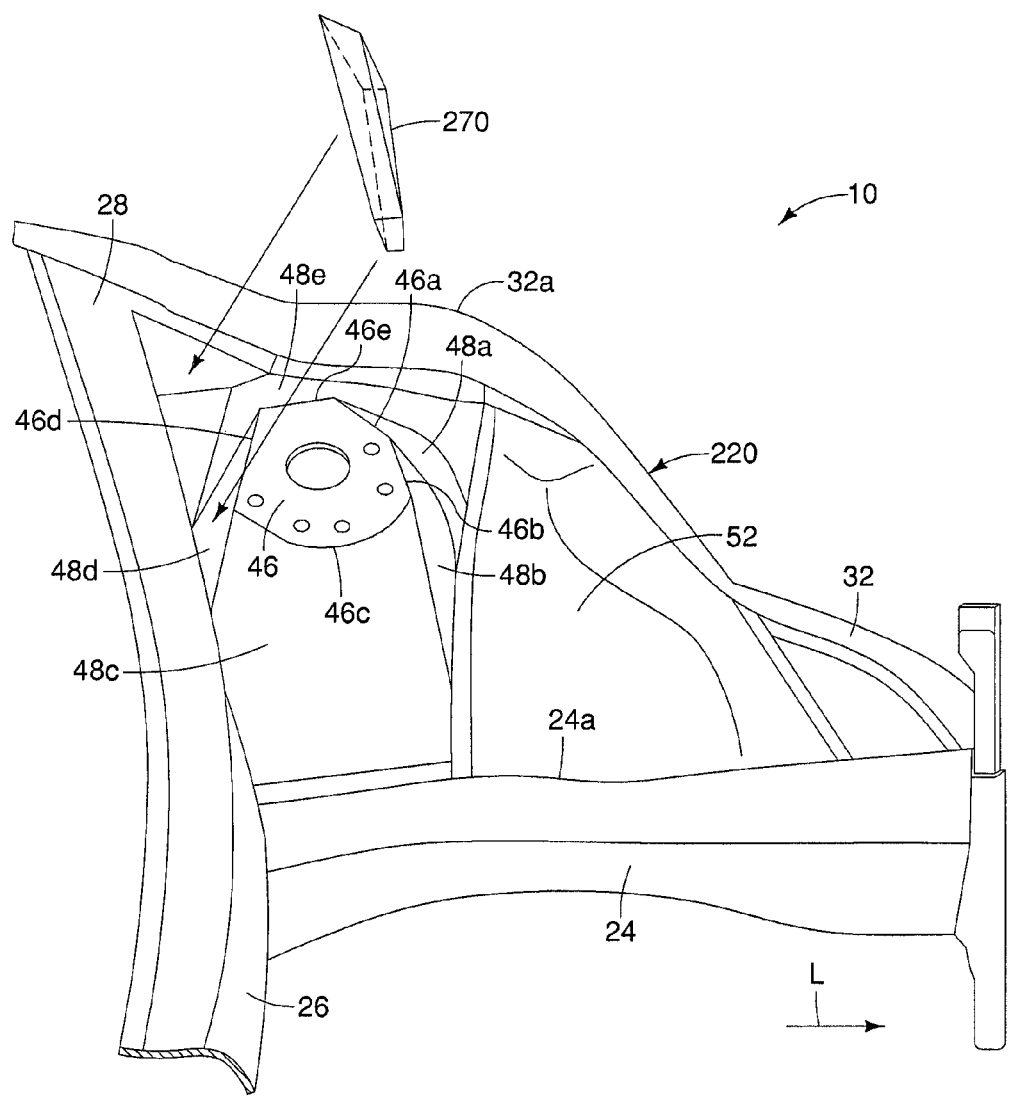
FIG. 19 is an exploded perspective view of a portion of the front structure of the vehicle showing the strut tower, the dash wall, the front side member and a reinforcement member that extends along a portion of the dash wall, as seen from within the engine compartment with the engine assembly removed in accordance with a third embodiment.

Referring now to FIGS. 16-18, a front body structure 120 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The front body structure 120 of the second embodiment includes all of the features of the first embodiment described above, such as the strut tower 14, the front side member 24, the dash wall 26, the A-pillar 28, the sill 30 and the hood ledge 32. However in the second embodiment the reinforcement bracket 70 has been omitted. Instead, the second embodiment employs a reinforcement member 170, which extends from an inboard side of the strut tower 14 rearward to the cross member 44. The reinforcement member 170 passes through an opening (not shown) in the dash wall 26 such that a first end of the reinforcement member 170 is fixedly attached to the strut tower 14 and a second end is fixedly attached to the cross-member 44. The reinforcement member 170 can be fastened or welded to the wall section 48c of the strut tower 14 and can further be fastened or welded to the cross member 44.

As shown in FIGS. 17 and 18, the reinforcement member 170 provides rigidity to the strut tower 14. As with the first embodiment, the force receiving surface 60 of the strut tower 14 defines a ramping surface that deflects at least a portion of the kinetic energy associated with the velocity $V_1$ of the vehicle 10 as the strut tower 14 and the rigid barrier B contact one another. The initial velocity $V_1$ (FIG. 17) of the vehicle 10 is directed in the vehicle longitudinal direction L. As shown in FIG. 18, as the rigid barrier B is deflected along the force receiving surface 60, the kinetic energy associated with the velocity $V_1$ of the vehicle 10 is redirected into lateral velocity $V_L$ in the vehicle lateral direction D. Consequently, a portion of the velocity $V_1$ (FIG. 17) is reduced to a velocity $V_2$ in FIG. 18 and a portion of the kinetic energy of the vehicle 10 is redirected into the lateral component of force or velocity $V_L$, moving the vehicle 10 laterally away from the rigid barrier B.

In the second embodiment, the inboard side of the strut tower 14 is reinforced by the reinforcing member 170. Consequently the inboard side of the strut tower 14 is more rigid than an outboard side of the strut tower 14. If the strut tower 14 should undergo deformation during the impact event, the force receiving surface 60 will deform such that the ramping or deflecting capability of the force receiving surface 60 is enhanced, as is described more clearly below in the fourth embodiment.

Third Embodiment

Referring now to FIGS. 19-22, a front body structure 220 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

The front body structure 220 of the third embodiment includes all of the features of the first embodiment described above, such as the strut tower 14, the front side member 24, the dash wall 26, the A-pillar 28, the sill 30 and the hood ledge 32. However in the third embodiment the reinforcement bracket 70 has been omitted. Instead, the third embodiment employs a reinforcement member 270, which extends along the dash wall 26 from the A-pillar 28 inboard and behind the strut tower 14, but spaced apart from the strut tower 14. The reinforcement member 270 fixedly attaches to the dash wall 28 and the A-pillar 28 by either mechanical fasteners, welding or a combination thereof.

As well, the strut tower 14 can be re-configured such that the inboard side of the strut tower 14 is strengthened with, for example, a thicker metal plate material as compared to the outboard side of the strut tower 14.

Figure 20:
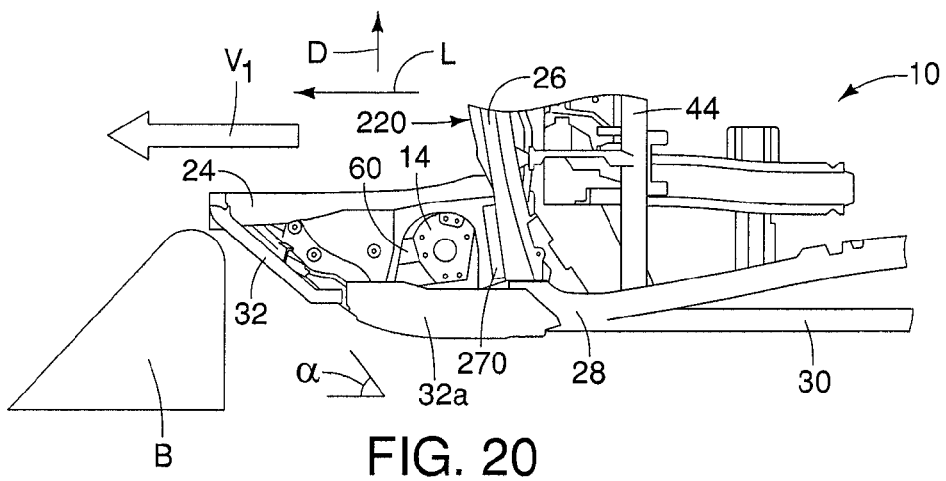
FIG. 20 is a schematic top view of the portion of the front structure of the vehicle showing the reinforcement member extending along the portion of the dash wall and the A-pillar, and showing a force receiving surface of the strut tower in relation to a rigid barrier just prior to an impact event in a small overlap test in accordance with the third embodiment.
Figure 21:
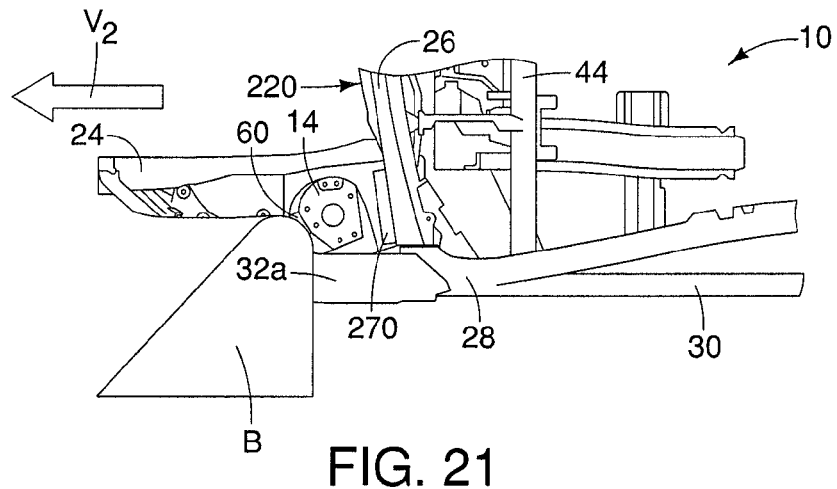
FIG. 21 is another schematic top view of the portion of the front structure of the vehicle similar to FIG. 20, showing the force receiving surface of the strut tower during initial stages of the impact event with the rigid barrier contacting the force receiving surface during the small overlap test, and with the strut tower beginning to rotate and undergo rearward deformation moving toward the reinforcement member and the front structure (and the vehicle) beginning to undergo lateral movement in accordance with the third embodiment.
Figure 22:
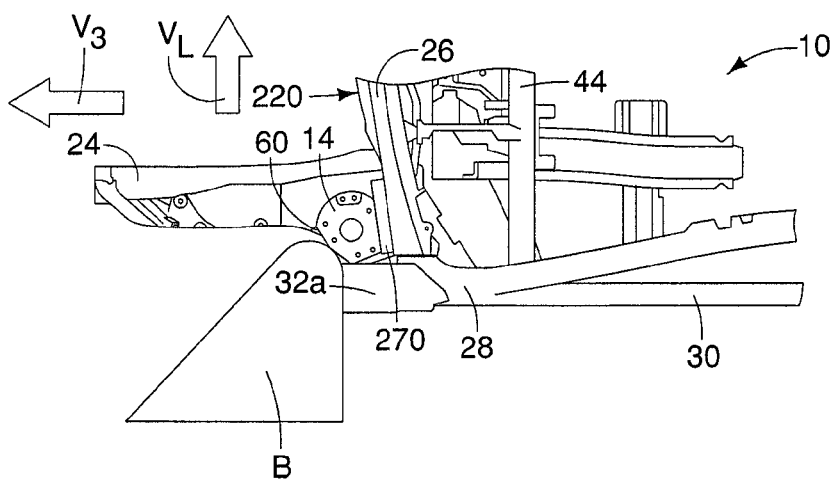
FIG. 22 is another schematic top view of the portion of the front structure of the vehicle similar to FIGS. 20 and 21, showing the force receiving surface of the strut tower during the continuing impact event, the strut tower having undergone rotation and rearward deformation such that the strut tower contacts the reinforcement member during the small overlap test with the front structure (and the vehicle) undergoing further lateral movement in accordance with the third embodiment.

As shown in FIGS. 20-22, the reinforcement member 270 provides rigidity to the dash wall 26 in the event that the strut tower 14 is deformed, moves rearward and contacts the reinforcement member 270. As with the first embodiment, the force receiving surface 60 of the strut tower 14 defines a ramping surface that deflects at least a portion of the kinetic energy associated with the velocity $V_1$ of the vehicle 10 as the strut tower 14 and the rigid barrier B contact one another during the small overlap test. The initial velocity $V_1$ (FIG. 20) of the vehicle 10 is directed in the vehicle longitudinal direction L. As shown in FIG. 21, since the inboard side of the strut tower 14 is stiffer, as compared to the outboard side of the strut tower, the strut tower 14 can rotate and deform in response to initial contact with the rigid barrier B during the small overlap test. The rotation of the strut tower 14 changes the angle of inclination of the force receiving surface 60, as shown in FIG. 21. The change in the angle of inclination enhances the deflecting ability of the force receiving surface 60. As shown in FIG. 21, the initial velocity $V_1$ is reduced to the velocity $V_2$ due to the deformation and rotation of the strut tower 14.

As the small overlap test continues, as shown in FIG. 22, the strut tower 14 becomes pressed up against the reinforcement member 270. As shown in FIG. 22, the strut tower 14 is therefore confined against the reinforcement member 270, the dash wall 26 and the A-pillar 28 by the rigid barrier B. The rigid barrier B is thereafter deflected along the force receiving surface 60, and the kinetic energy associated with the velocity $V_2$ of the vehicle 10 is redirected into lateral velocity $V_L$ in the vehicle lateral direction D. Consequently, a portion of the velocity $V_2$ (FIG. 21) is reduced to a velocity $V_3$ (FIG. 22). The kinetic energy of the vehicle 10 represented by the velocity $V_L$ translates into lateral movement of the vehicle 10 away from the rigid barrier B.

Fourth Embodiment

Figure 23:
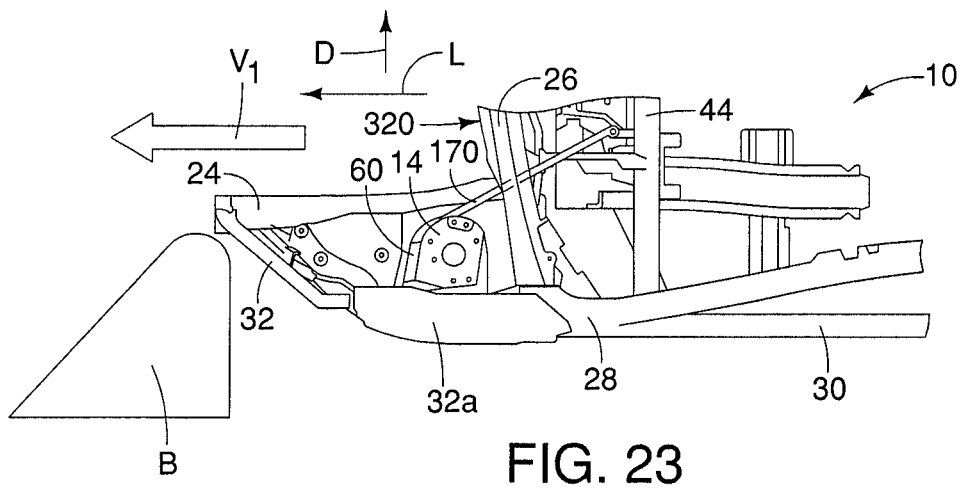
FIG. 23 is a schematic top view of a portion of the front structure of the vehicle showing a cross-member and a reinforcement member extending from an inboard section of the strut tower to the cross-member, and showing a force receiving surface of the strut tower in relation to a rigid barrier just prior to an impact event in a small overlap test in accordance with a fourth embodiment.
Figure 24:
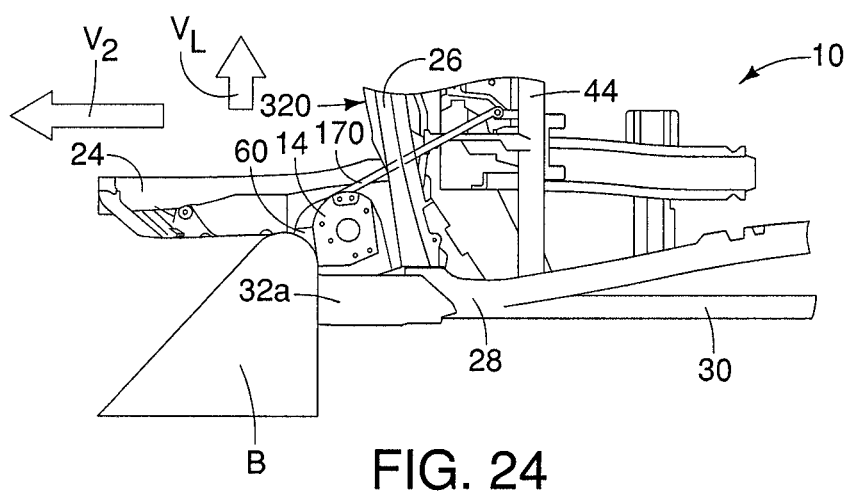
FIG. 24 is another schematic top view of the portion of the front structure of the vehicle similar to FIG. 23, showing the force receiving surface of the strut tower during initial stages of the impact event, with the rigid barrier contacting the force receiving surface during the small overlap test, with strut tower beginning to undergo rotation and deformation, and with the front structure (and the vehicle) beginning to undergo lateral movement in accordance with the fourth embodiment.
Figure 25:
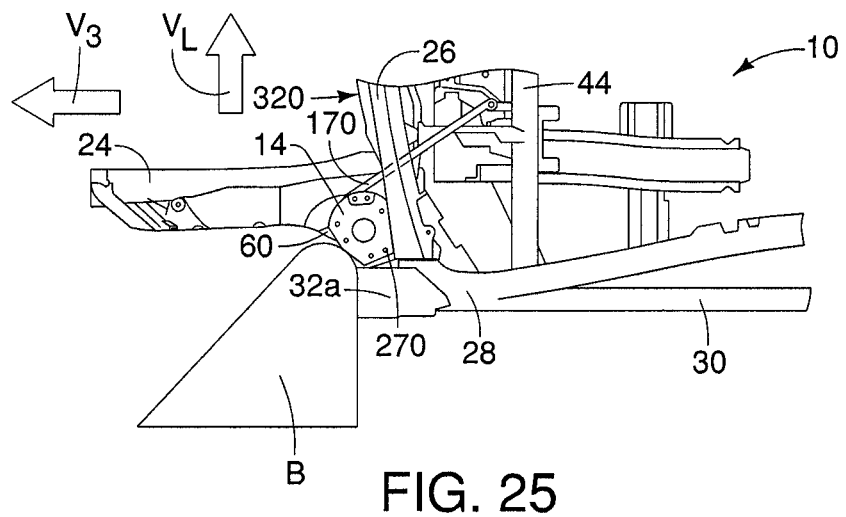
FIG. 25 is another schematic top view of the portion of the front structure of the vehicle similar to FIGS. 23 and 24, showing the force receiving surface of the strut tower during the continuing impact event, with the strut tower having undergone rotation and deformation such that the strut tower contacts the dash wall during the small overlap test, and with the front structure (and the vehicle) undergoing further lateral movement in accordance with the fourth embodiment.

Referring now to FIGS. 23-25, a front body structure 320 in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

The front body structure 320 of the fourth embodiment includes all of the features of the first embodiment described above, such as the strut tower 14, the front side member 24, the dash wall 26, the A-pillar 28, the sill 30 and the hood ledge 32. However in the fourth embodiment the reinforcement bracket 70 has been omitted. Instead, the fourth embodiment employs the reinforcement member 170, of the second embodiment. As described with the second embodiment, the reinforcement member 170 extends from an inboard side of the strut tower 14 rearward to the cross member 44. The reinforcement member 170 passes through an opening (not shown) in the dash wall 26 such that a first end of the reinforcement member 170 is fixedly attached to the strut tower 14 and a second end is fixedly attached to the cross-member 44. The reinforcement member 170 can be fastened or welded to the wall section 48c of the strut tower 14 and can further be fastened or welded to the cross member 44.

As shown in FIGS. 23-25, the reinforcement member 170 provides rigidity to the outboard side of the strut tower 14. As with the first embodiment, the force receiving surface 60 of the strut tower 14 defines a ramping surface that deflects at least a portion of the kinetic energy associated with the initial velocity $V_1$ of the vehicle 10 as the strut tower 14 and the rigid barrier B contact one another during the small overlap test. The initial velocity $V_1$ (FIG. 23) of the vehicle 10 is directed in the vehicle longitudinal direction L. As shown in FIG. 24, since the inboard side of the strut tower 14 is stiffened by the reinforcement member 170, the strut tower 14 can rotate and deform in response to initial contact with the rigid barrier B during the small overlap test. The rotation of the strut tower 14 changes the angle of inclination of the force receiving surface 60, as shown in FIG. 24. The change in the angle of inclination enhances the deflecting ability of the force receiving surface 60. As shown in FIG. 24, the initial velocity $V_1$ is reduced due to the velocity $V_2$ due to the deformation and rotation of the strut tower 14.

As the small overlap test continues, as shown in FIG. 25, the strut tower 14 becomes pressed up against the dash wall 26, which is reinforced by the A-pillar 28. As shown in FIG. 25, the strut tower 14 is therefore confined against the dash wall 26 by the rigid barrier B. The rigid barrier B is thereafter deflected along the force receiving surface 60, and the kinetic energy associated with the velocity $V_2$ of the vehicle 10 is redirected into lateral velocity $V_L$ in the vehicle lateral direction D. Consequently, a portion of the velocity $V_2$ (FIG. 24) is reduced to a velocity $V_3$ (FIG. 25). The kinetic energy of the vehicle 10 represented by the velocity $V_L$ translates into lateral movement of the vehicle 10 away from the rigid barrier B.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle front body structure. Accordingly, these terms, as utilized to describe the present invention should be interpreted relative to a vehicle equipped with the vehicle front body structure.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle front body structure comprising
a front side member extending in a vehicle longitudinal direction of a vehicle;
an A-pillar coupled to the front side member; and
a strut tower positioned forward of the A-pillar and having an inboard side fixedly attached to an outboard section of the front side member and a force receiving surface extending between the inboard side and an outboard side, the force receiving surface having an upper inboard corner and an upper outboard corner defined at a top plate of the strut tower, the upper inboard corner being located forward of the upper outboard corner relative to the vehicle longitudinal direction, at least a portion of the force receiving surface being planar, the force receiving surface of the strut tower being configured and arranged to receive a force directed rearward in the vehicle longitudinal direction, and redirect at least a portion of the force in a vehicle lateral direction toward the front side member, the force receiving surface further defining a ramp such that in response to receiving the force directed rearward in the vehicle longitudinal direction, the redirected force urges the vehicle to move in the vehicle lateral direction.

2. The vehicle front body structure according to claim 1, wherein
the force receiving surface extends rearwardly and laterally outboard away from the front side member at an inclined angle with respect to the vehicle longitudinal direction.

3. The vehicle front body structure according to claim 2, wherein
the inclined angle is less than 60 degrees.

4. The vehicle front body structure according to claim 1, further comprising a reinforcement member fixedly attached to both the A-pillar and the strut tower.

5. The vehicle front body structure according to claim 4, wherein
the A-pillar and the strut tower are spaced apart from one another with the reinforcement member extending between the A-pillar and the strut tower.

6. The vehicle front body structure according to claim 1, wherein
the strut tower is configured to move from a non-deformed orientation to a deformed orientation in response to the force receiving surface receiving a first portion of the force directed rearward in the vehicle longitudinal direction.

7. The vehicle front body structure according to claim 6, wherein
with the force receiving surface in the deformed orientation the force receiving surface extends rearwardly and laterally outboard away from the front side member at an inclined angle with respect to the vehicle longitudinal direction.

8. The vehicle front body structure according to claim 6, further comprising
a reinforcement member fixedly attached to the A-pillar and to the strut tower.

9. The vehicle front body structure according to claim 6, further comprising
a cross-member having a first end fixedly coupled to the A-pillar, the cross-member extending in the vehicle lateral direction within the vehicle away from the A-pillar; and
a reinforcement member having a first end fixedly attached to the strut tower and a second end fixedly attached to the cross-member.

10. The vehicle front body structure according to claim 9, wherein
the cross-member has a second end fixedly attached to a second A-pillar at an opposite side of the vehicle from the A-pillar, the cross-member being located within a passenger compartment of the vehicle.

11. The vehicle front body structure according to claim 10, wherein
the cross-member is concealed behind an instrument panel within the passenger compartment.

12. The vehicle front body structure according to claim 1, wherein
the strut tower is formed such that the inboard side of the strut tower has a greater structural resistance to the force directed rearward in the vehicle longitudinal direction than the outboard side of the strut tower.

13. The vehicle front body structure according to claim 12, wherein
the inboard side of the strut tower has a greater material thickness than the outboard side of the strut tower.

14. The vehicle front body structure according to claim 1, wherein
the portion of the force receiving surface that is planar is spaced apart from the front side member, and the strut tower includes a wall section having a curved contour attached at a lower end thereof to the front side member, the wall section being located between the portion of the force receiving surface that is planar and the front side member.

15. A vehicle front body structure comprising
a dash wall extending in a vehicle lateral direction of a vehicle separating a front end of the vehicle from a passenger compartment of the vehicle;
a front side member extending forward from the dash wall in a vehicle longitudinal direction of the vehicle;
an A-pillar coupled to the front side member and the dash wall;
a strut tower positioned forward of the A-pillar and the dash wall, the strut tower having an inboard side fixedly attached to an outboard section of the front side member and a force receiving surface extending between the inboard side and an outboard side, the force receiving surface of the strut tower being configured and arranged to receive a force directed rearward in the vehicle longitudinal direction, and redirect at least a portion of the force in a vehicle lateral direction toward the front side member;
a cross-member fixedly coupled to the A-pillar and extending in the vehicle lateral direction within the passenger compartment of the vehicle spaced apart from the dash wall in the vehicle longitudinal direction of the vehicle; and
a reinforcement member having a first end fixedly attached to the strut tower and a second end fixedly attached to the cross-member.

16. The vehicle front body structure according to claim 15, wherein
the force receiving surface extends rearwardly and laterally outboard away from the front side member at an inclined angle with respect to the vehicle longitudinal direction, and the force receiving surface defines a ramp such that in response to receiving the force directed rearward in the vehicle longitudinal direction, the redirected force urges the vehicle to move in the vehicle lateral direction.

17. The vehicle front body structure according to claim 15, wherein
the first end of the reinforcement member is fixedly attached to the inboard side of the strut tower.

18. The vehicle front body structure according to claim 15, wherein
the strut tower is configured to move from a non-deformed orientation to a deformed orientation in response to the force receiving surface receiving a first portion of the force directed rearward in the vehicle longitudinal direction,
with the force receiving surface in the deformed orientation the force receiving surface extends rearwardly and laterally outboard away from the front side member at an inclined angle with respect to the vehicle longitudinal direction; and
with the force receiving surface in the deformed orientation, the force receiving surface defines a ramp such that in response to receiving further amounts of the force directed rearward in the vehicle longitudinal direction, the redirected force urges the vehicle to move in the vehicle lateral direction.

19. The vehicle front body structure according to claim 15, wherein
the dash wall includes an aperture with the reinforcement member extending through the aperture with a first portion of the reinforcement member being located on a front side of the dash wall and a second portion of the reinforcement member being located on a rear side of the dash wall.

20. A vehicle front body structure comprising
a front side member extending in a vehicle longitudinal direction of a vehicle;
an A-pillar coupled to the front side member;
a strut tower positioned forward of the A-pillar and having an inboard side fixedly attached to an outboard section of the front side member and a force receiving surface extending between the inboard side and an outboard side, the force receiving surface of the strut tower being configured and arranged to receive a force directed rearward in the vehicle longitudinal direction, and redirect at least a portion of the force in a vehicle lateral direction toward the front side member, the strut tower being configured to move from a non-deformed orientation to a deformed orientation in response to the force receiving surface receiving a first portion of the force directed rearward in the vehicle longitudinal direction; and a reinforcement member fixedly attached to the A-pillar and spaced apart from the strut tower with the strut tower in the non-deformed orientation, and with the strut tower in the deformed orientation, the strut tower contacts the reinforcement member.

* * * * *